F. W. FLATO.
Bird-Cage.
No. 224,163. Patented Feb. 3, 1880.
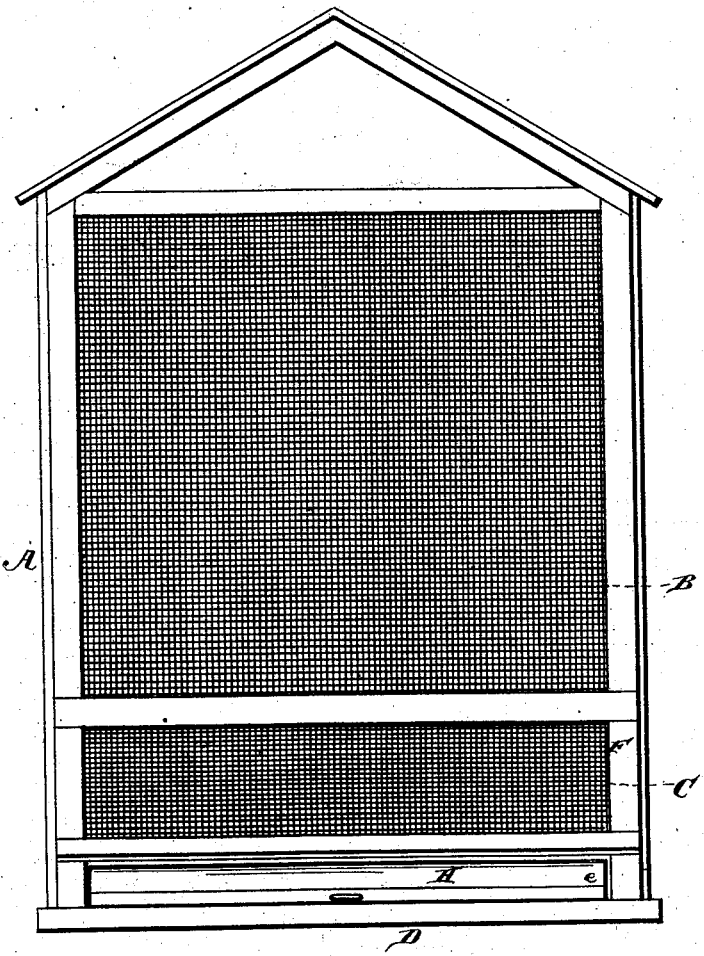
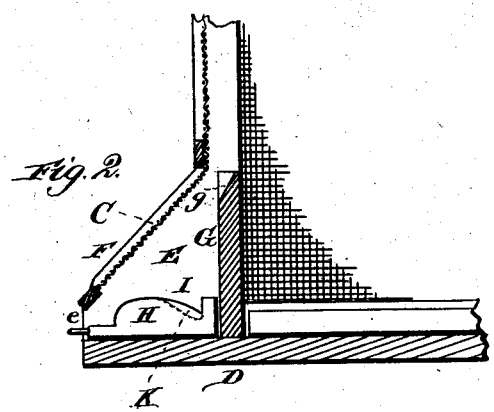
WITNESSES
Robert Everitt
Chas. G. Page
INVENTOR
Fridrich W. Flato
Gilmore Smith & Co.
ATTORNEYS

UNITED STATES PATENT OFFICE.

FRIDRICH W. FLATO, OF FLATONIA, TEXAS.

BIRD-CAGE.

SPECIFICATION forming part of Letters Patent No. 224,163, dated February 3, 1880.

Application filed December 5, 1879.

*To all whom it may concern:*

Be it known that I, FRIDRICH W. FLATO, of Flatonia, in the county of Fayette and State of Texas, have invented certain new and useful Improvements in Bird-Cages; and I do hereby declare that the following is a full, clear, and exact description of the construction and operation of the same, reference being had to the annexed drawings, making a part of this specification, and to the letters and figures of reference marked thereon.

Figure 1 of the drawings is a representation of an end of my bird-cage, and Fig. 2 is a sectional detail view of the same.

This invention relates to improvements in bird-cages; and it consists in a bird-cage having a woven-wire casing the meshes of which cannot be penetrated by ordinary insects, such as flies, &c., provided with a baited trap through which flies, &c., will be lured into the cage to be devoured by the bird, as will be hereinafter fully described, and particularly pointed out in the claims.

In the drawings, A designates the framework, and B the woven-wire sides, of a bird-cage, the whole being arranged so as to form either a square or a circular cage, as may be desired by the manufacturer.

In the square-shaped cage herein shown the vertical sides or ends extend down to within a short distance above the bottom of the cage and then incline outwardly, as illustrated at C. A simple and effective mode of constructing this part of the cage will be to secure upon extended ends of the bottom D the inclined blocks E, and to secure upon these blocks the ends of the inclined frame F, so that the fabric of the ends or sides B may be continued in length and fastened to the inclined frames, as more clearly illustrated in Fig. 2.

It will be understood that the above arrangement of parts may be made at either one or both ends of the cage, as it may be desired to form one or two openings or traps for the flies.

At one or both ends or sides of the cage, as the case may be, I arrange a cross-strip or partition-piece, G, so as to leave a space, $g$, between its upper edge and the lower edge of the vertical portion of the end or side B of the cage.

The lower edge of the inclined extension C of the part B terminates a short distance above the bottom D, so as to leave a passage, $e$, through which the flies or other insects may enter, and also through which the strip or bait-table H may be passed into or out of the space I, formed between the strip G, inclined part C, and the extended end of the bottom of the cage.

The bait strip or table H is formed with a recess, K, into which any sweetened substance may be placed, which will attract flies through the passage $e$. When once within the space I the flies will, as a rule, not return by the passage through which they originally entered, but will pass up into the cage through the passage $g$, and there be caught by the bird.

When a round or circular cage is constructed with a trap the inclined frame and bait-table may be correspondingly curved.

Having thus described my improvement, what I claim, and desire to secure by Letters Patent, is—

1. A bird-cage having a woven-wire casing through which insects, such as flies, &c., cannot pass, provided with a baited trap having an ingress-opening and an egress to the interior of the cage, substantially as and for the purposes set forth.

2. A bird-cage having a woven-wire casing impenetrable to flies, &c., in combination with a trap consisting of the inclined blocks E, resting upon the extended ends of the bottom D, upon which are secured the ends of the inclined frame F, covered by the wire fabric, having passages $e$ and $g$, and a bait-receptacle, H I, substantially as and for the purposes set forth.

3. In a bird-cage, the combination of the top C, partition G, forming passages $e$ and $g$, and the bait-table H, substantially as and for the purposes set forth.

4. In a bird-cage, the combination of the top C of the trap with the side ends E, partition-strip G, forming passages $e g$, extended end of the bottom D, and the removable bait-table H, substantially as and for the purposes set forth.

In testimony that I claim the above I have hereunto subscribed my name in the presence of two witnesses.

FRIDRICH WILHELM FLATO.

Witnesses:
W. W. SLOAN,
O. B. NICHOLSON.